(12) United States Patent
Wada

(10) Patent No.: US 6,816,320 B2
(45) Date of Patent: Nov. 9, 2004

(54) ZOOM LENS SYSTEM AND PROJECTOR HAVING THE SAME

(75) Inventor: Ken Wada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/620,909

(22) Filed: Jul. 15, 2003

(65) Prior Publication Data

US 2004/0012860 A1 Jan. 22, 2004

(30) Foreign Application Priority Data

Jul. 22, 2002 (JP) ........................................ 2002-212655

(51) Int. Cl.[7] ............................................. G02B 15/14
(52) U.S. Cl. ...................................... 359/683; 359/676
(58) Field of Search ................................. 359/683, 676

(56) References Cited

U.S. PATENT DOCUMENTS 5,257,129 A * 10/1993 Morooka et al. ........... 359/432

6,639,737 B2 * 10/2003 Yasui et al. ................. 359/761

FOREIGN PATENT DOCUMENTS

JP          2001091829 A       6/2001

* cited by examiner

*Primary Examiner*—Scott J. Sugarman
(74) *Attorney, Agent, or Firm*—Morgan & Finnegan LLP

(57) ABSTRACT

A zoom lens system discloses a zoom lens system which is small in size and exhibits favorable optical performance. The zoom lens system, according to the present invention includes, in order from the front to the rear: a first lens unit having negative optical power; a second lens unit having positive optical power; a third lens unit having positive optical power; a fourth lens unit having positive optical power; and a fifth lens unit having positive optical power. Of these five lens units, at least three lens units move at the time of zooming. Further, the fifth lens unit is provided with a positive lens element having a relatively high refractive index.

10 Claims, 13 Drawing Sheets

ZOOM LENS SYSTEM AND PROJECTOR HAVING THE SAME

BACKGROUND OF THE INVENTION

1. Field of the Invention

The present invention relates to a zoom lens system, and more particularly, to a zoom lens system preferable for a projection optical system of a mobile liquid crystal projector.

2. Related Background Art

Up to now, various liquid crystal projectors (image projection apparatuses) have been proposed which use display elements, such as liquid crystal display elements, and project images based on the display elements onto screen surfaces.

In particular, such liquid crystal projectors have been widely used as apparatuses for projecting images formed by personal computers and the like onto large screens for conferences, presentations, and the like.

The following have recently been required for the liquid crystal projectors.

(1) In a three-panel projector using three liquid crystal display elements for three colors that are red (R), green (G), and blue (B), a mount space for optical elements, such as a polarizing plate and a dichroic prism serving as a color combining means for combining color light beams having passed through the liquid crystal display elements, must be provided between the liquid crystal display elements and a projection lens, and hence a predetermined back focal length is required.

(2) In order to minimize the influence of angle dependence of a color combining film used for the color combining means and in order to ensure a favorable pupil matching property with respect to an illumination system, a so-called telecentric optical system must be accomplished such that the pupil on the liquid crystal display element (reduction) side is located at infinity.

(3) When images (pictures) based on the liquid crystal display elements for the three colors are combined and projected on the screen, if characters and the like look doubled, a sense of resolution and quality are deteriorated. In order to prevent this, pixels for respective colors must be properly overlaid on each other throughout the entire screen. For that purpose, color misregistration (chromatic aberration of magnification) caused by the projection lens must be properly corrected throughout the entire visible region (the lens system must be an apochromat system).

(4) In order to prevent a contour portion of a projected image from being distorted undesirably, distortion must be properly corrected (in particular, if an abrupt distortion change or the like remains in a peripheral portion or an intermediate portion of an image, for instance, image quality will be degraded and thus this is not preferable).

(5) In consideration of mobility of a projector equipped with a compact panel, reductions in apparatus size and weight as well as increases in luminance of a screen and resolution of images are needed.

(6) In consideration of use environment of such a small-sized image projection apparatus, projection of a large image with a shorter projection distance must be accomplished.

Meanwhile, various zoom lenses have conventionally been proposed as projection lenses for liquid crystal projectors.

Of those zoom lenses, a retrofocus type zoom lens, in which a lens unit having negative refractive power serves as a front lens unit, is widely used for projectors as a projection lens for a wide angle of view. Aside from this, the retrofocus type zoom lens is also widely used for optical devices, such as video cameras, film cameras, and digital cameras, as a photographing lens.

For instance, Japanese Patent Application Laid-Open No. 2001-091829 proposes a projection lens for a liquid crystal projector, which is a five-unit zoom lens in which five lens units respectively having negative refractive power, positive refractive power, positive refractive power, positive refractive power, and positive refractive power are arranged in order from the enlargement side. When magnification of the zoom lens is to be changed, predetermined lens units out of the five lens units are moved as appropriate.

In this five-unit zoom lens, the first lens unit and the fifth lens unit are fixed, and the magnification change from the wide-angle end to the telephoto end is performed by moving each of the second lens unit to the fourth lens unit in the lens system to the reduction side. With this construction, a wide angle of view is realized and telecentricity is ensured while maintaining a constant entire lens length.

As for a projection lens that enlarges and projects an image displayed by a liquid crystal display element onto a screen, there is desired a lens system that achieves a large aperture and an increase in angle of view with a small size and a light weight.

When the aperture of a projection lens is increased for higher brightness and an angle of view is increased, however, aberration correction becomes difficult and the projection lens increases in size, in general. Also, when the number of lens constituting the projection lens is increased, a spectral transmission factor is lowered.

In the zoom lens proposed in Japanese Patent Application Laid-Open No. 2001-091829 described above, the F number is set at "2" that is large (dark), and the number of lenses constituting the entire system is around 12 that is relatively large.

Also, the material of the lens constituting the fifth lens unit added closest to the reduction conjugate side (original image side) has a small refractive index, so that aberration correction concerning off-axis luminous fluxes tends to become difficult.

SUMMARY OF THE INVENTION

The present invention provides a zoom lens system that favorably suppresses variations in various aberrations accompanying zooming and exhibits favorable optical performance throughout the entire screen while achieving reduction in size of the entire lens system.

A zoom lens system according to an aspect of the present invention includes, in order from the front (screen side in the case of a projector and object side in the case of a camera) to the rear (original image side in the case of the projector and image side in the case of the camera): a first lens unit having negative optical power; a second lens unit having positive optical power; a third lens unit having positive optical power; a fourth lens unit having positive optical power; and a fifth lens unit having positive optical power. Of these five lens units, at least three lens units move during zooming. Also, as is defined by the following conditional expression, the fifth lens unit is provided with a positive lens element having a relatively high refractive index.

DESCRIPTION OF THE PREFERRED EMBODIMENTS

Embodiments of a zoom lens system according to the present invention and a projector and a camera using the zoom lens system will now be described with reference to the accompanying drawings.

Figure 1:
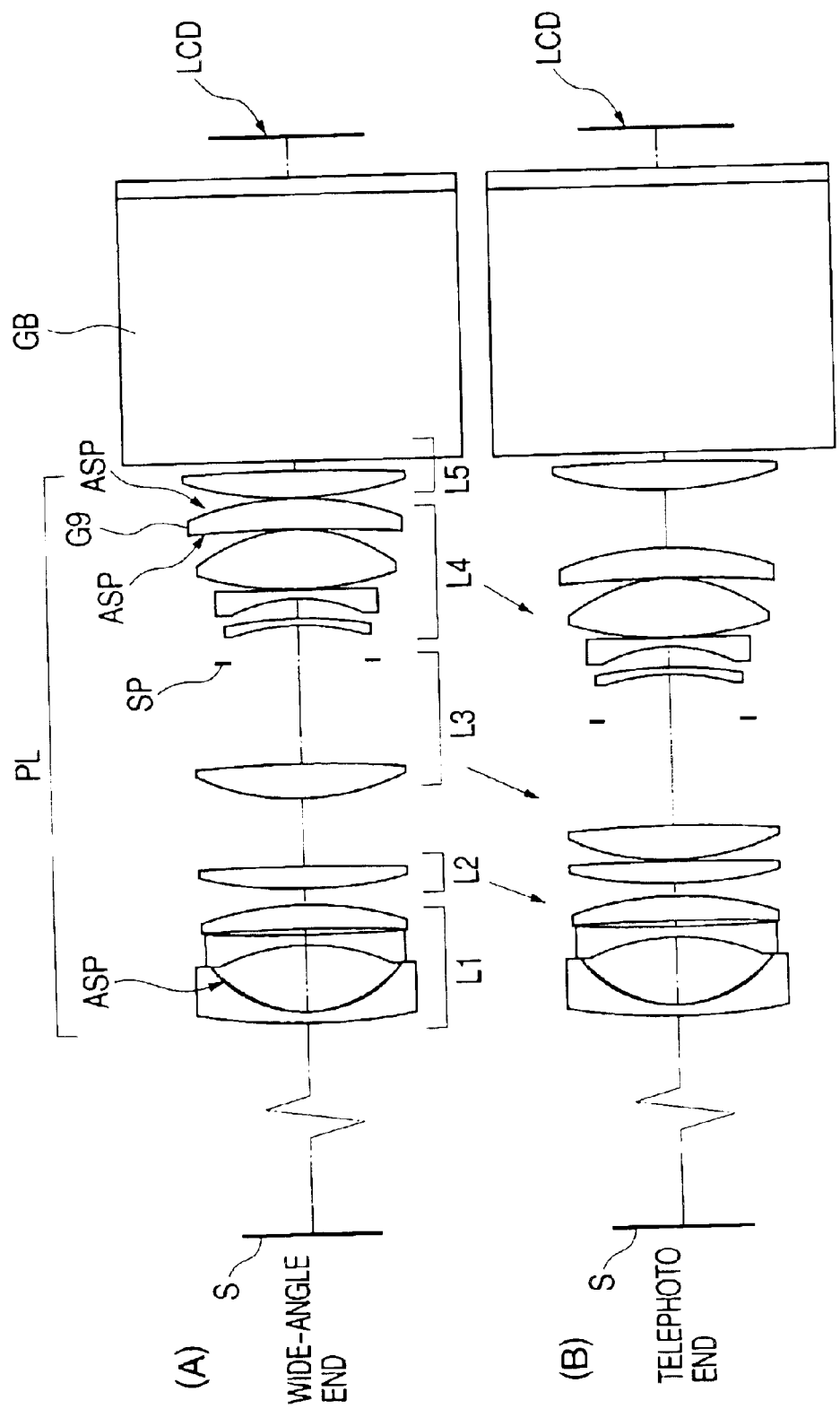
FIG. 1 is a schematic diagram showing a main portion of a zoom lens according to a first embodiment.
Figure 2:
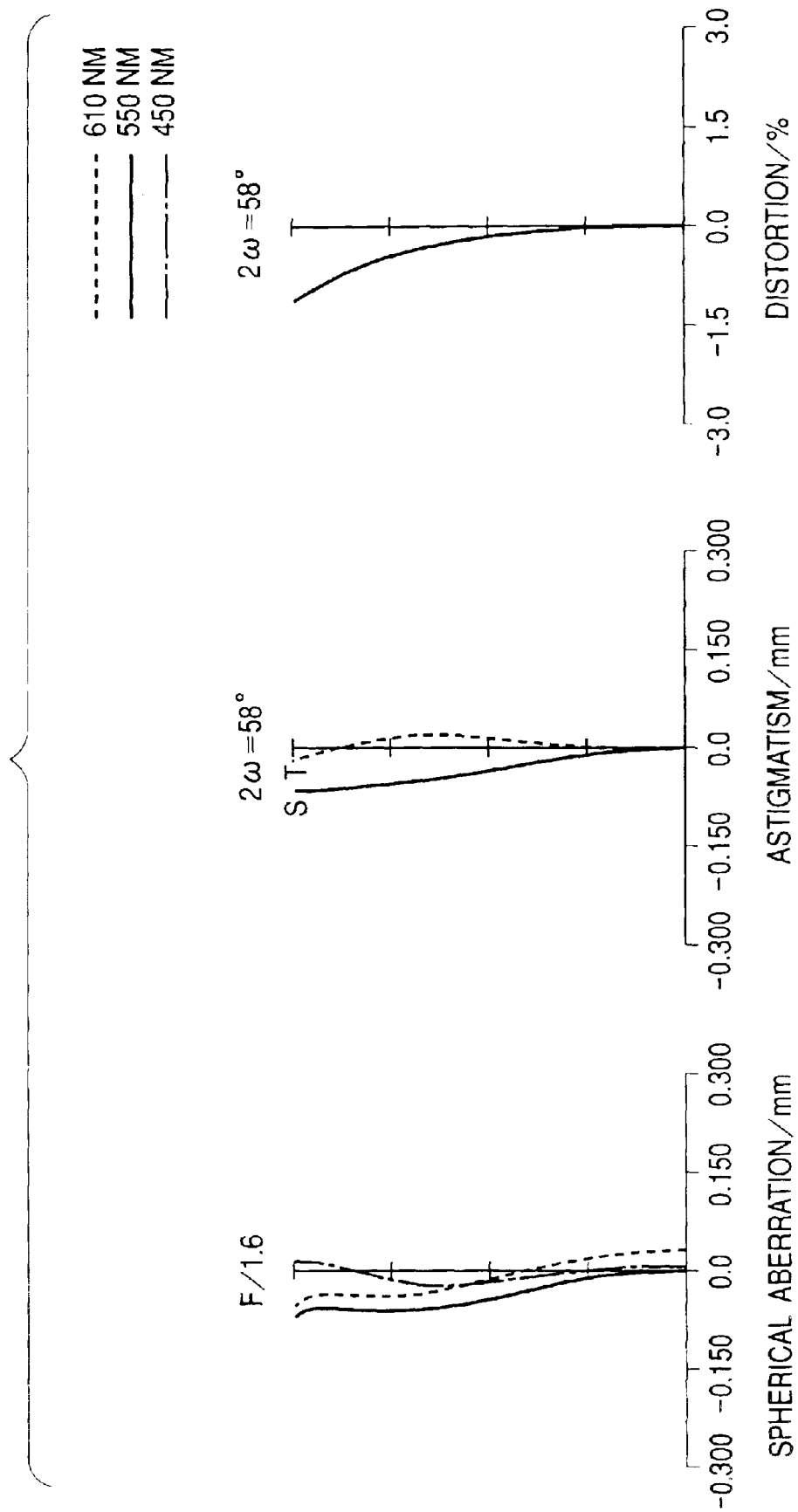
FIG. 2 is an aberration diagram at the wide-angle side of the zoom lens according to the first embodiment (distance to a screen is 2.1 m)
Figure 3:
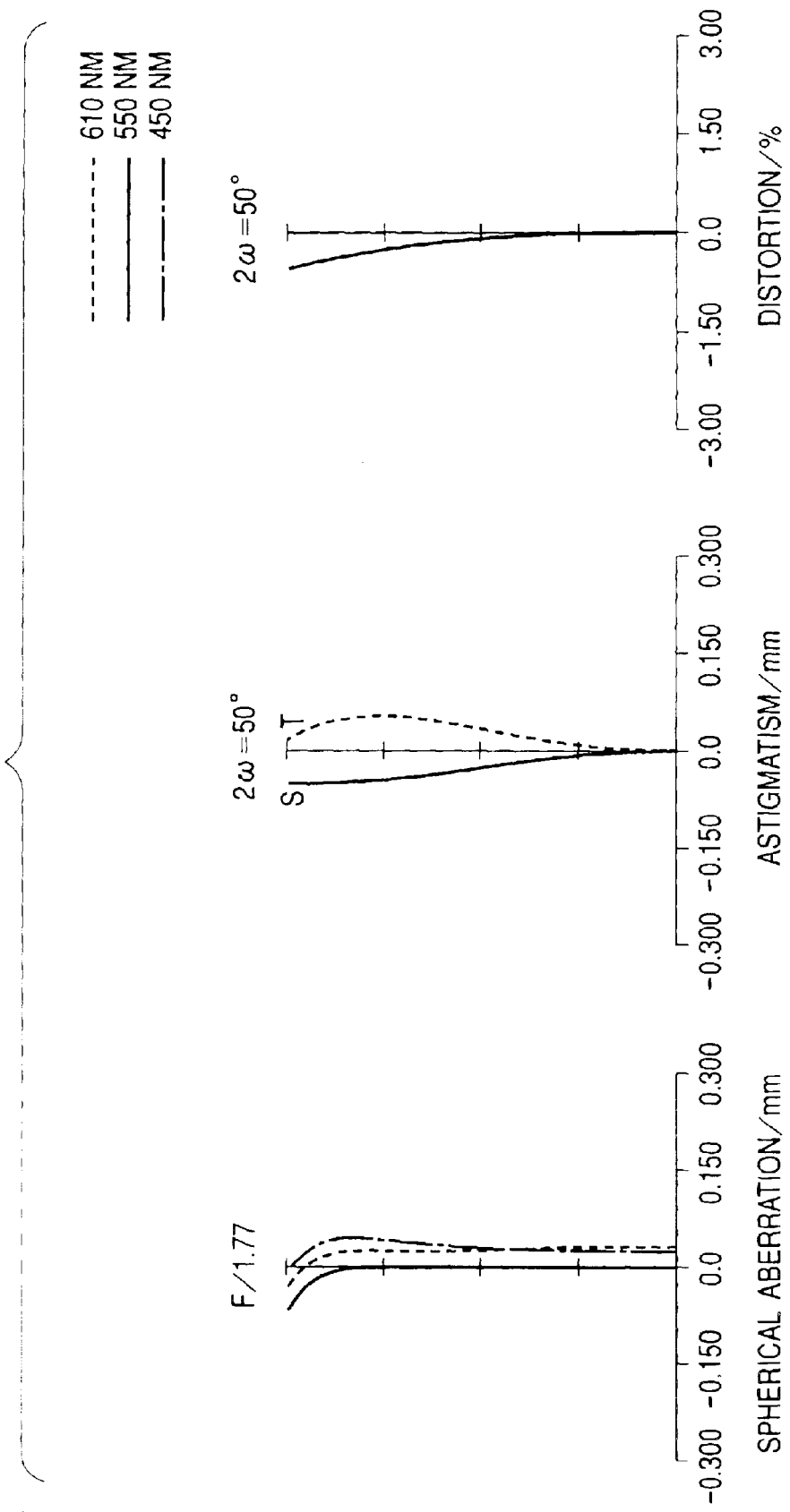
FIG. 3 is an aberration diagram at the telephoto end of the zoom lens according to the first embodiment (distance to the screen is 2.1 m)

FIG. 1 is a schematic diagram showing a main portion of a zoom lens according to a first embodiment of the present invention. The illustrated positional relationship between a screen and an original image similarly applies to zoom lenses according to other embodiments. FIGS. 2 and 3 are respectively aberration diagrams at a short focal length end (the so-called wide-angle end) and a long focal length end (the so-called telephoto end) of the zoom lens according to the first embodiment, with a distance to the screen being set at 2.1 m.

Figure 4:
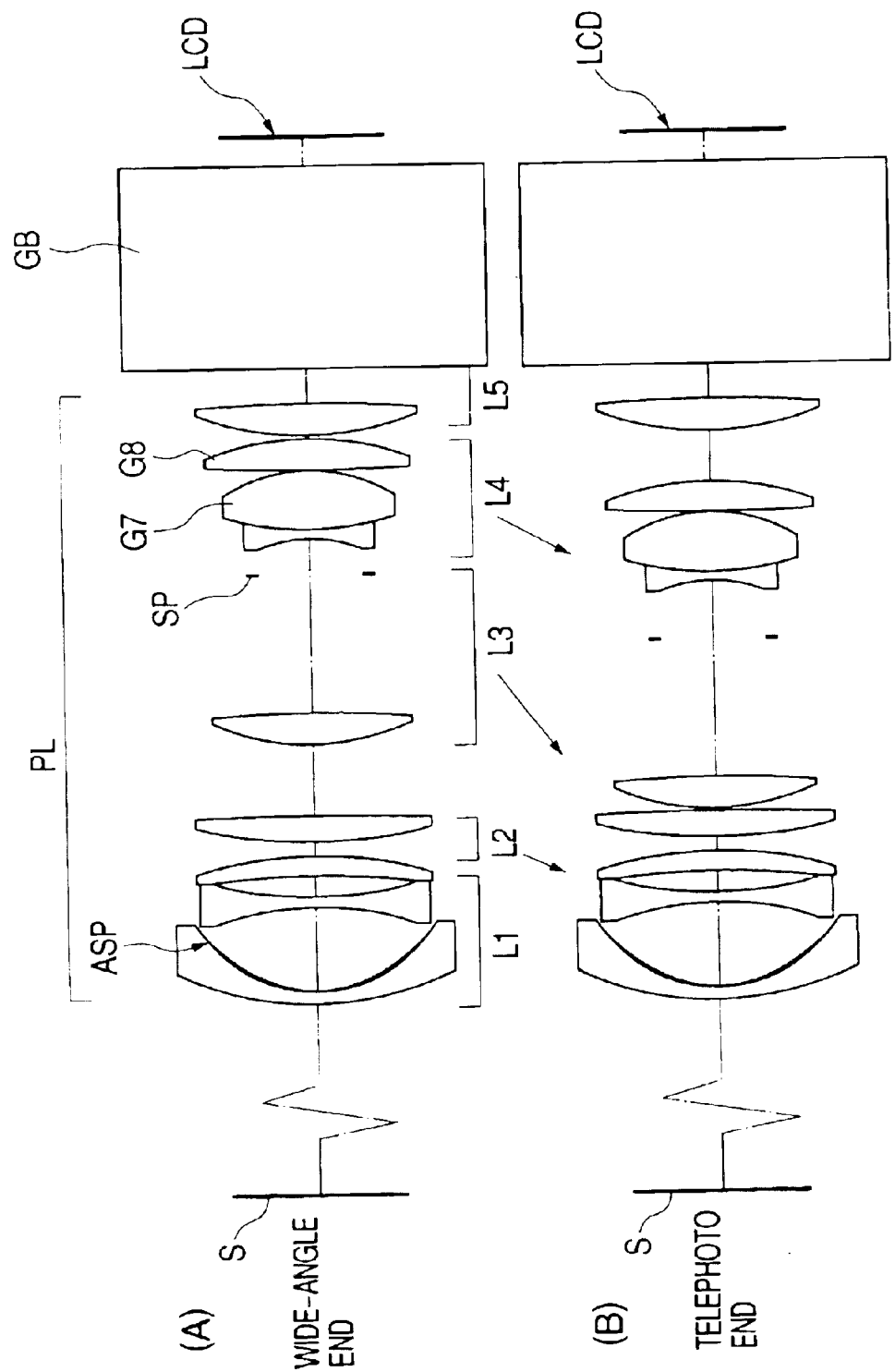
FIG. 4 is a schematic diagram showing a main portion of a zoom lens according to a second embodiment.
Figure 5:
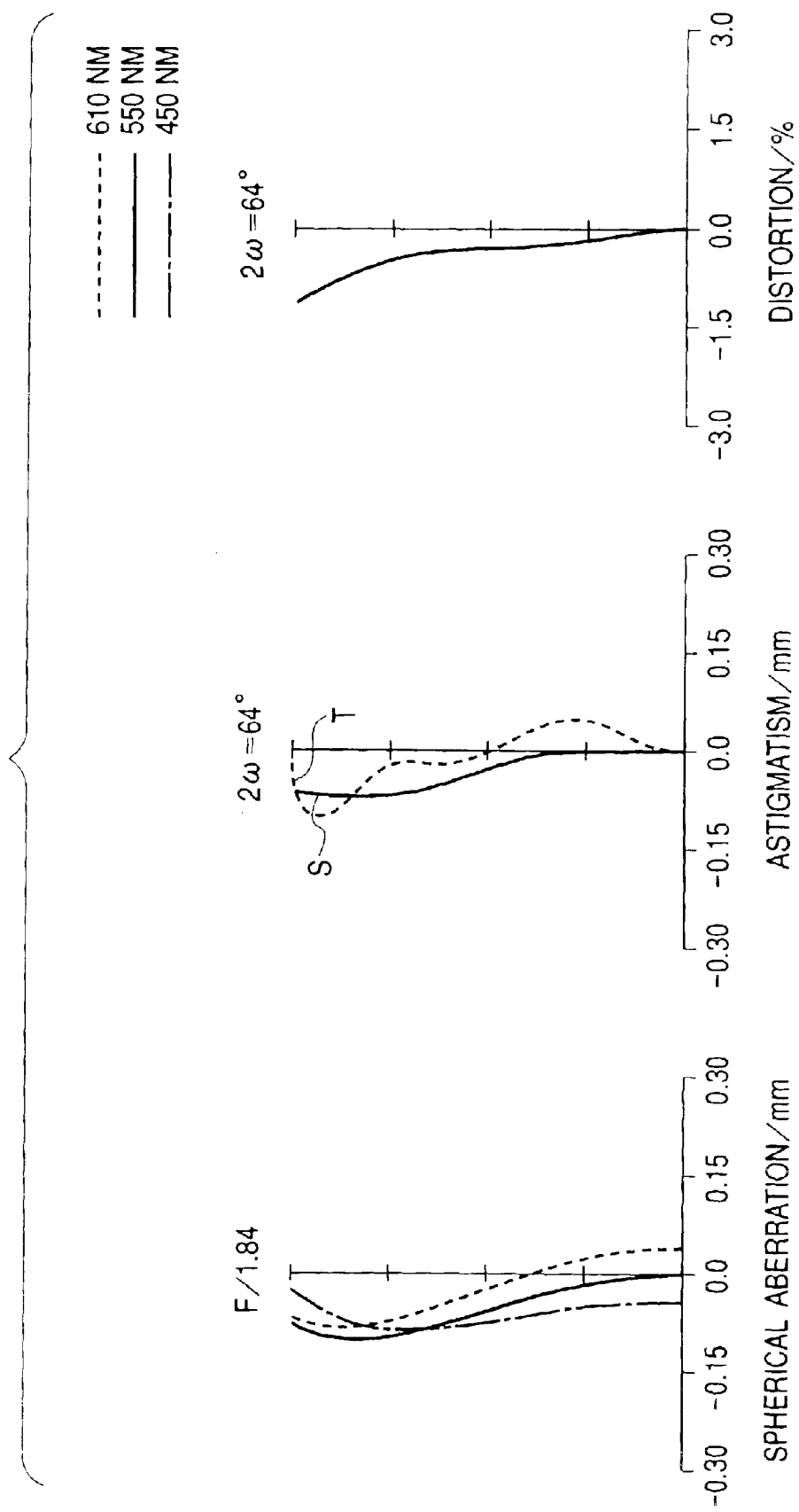
FIG. 5 is an aberration diagram at the wide-angle end of the zoom lens according to the second embodiment (distance to the screen is 1.9 m)
Figure 6:
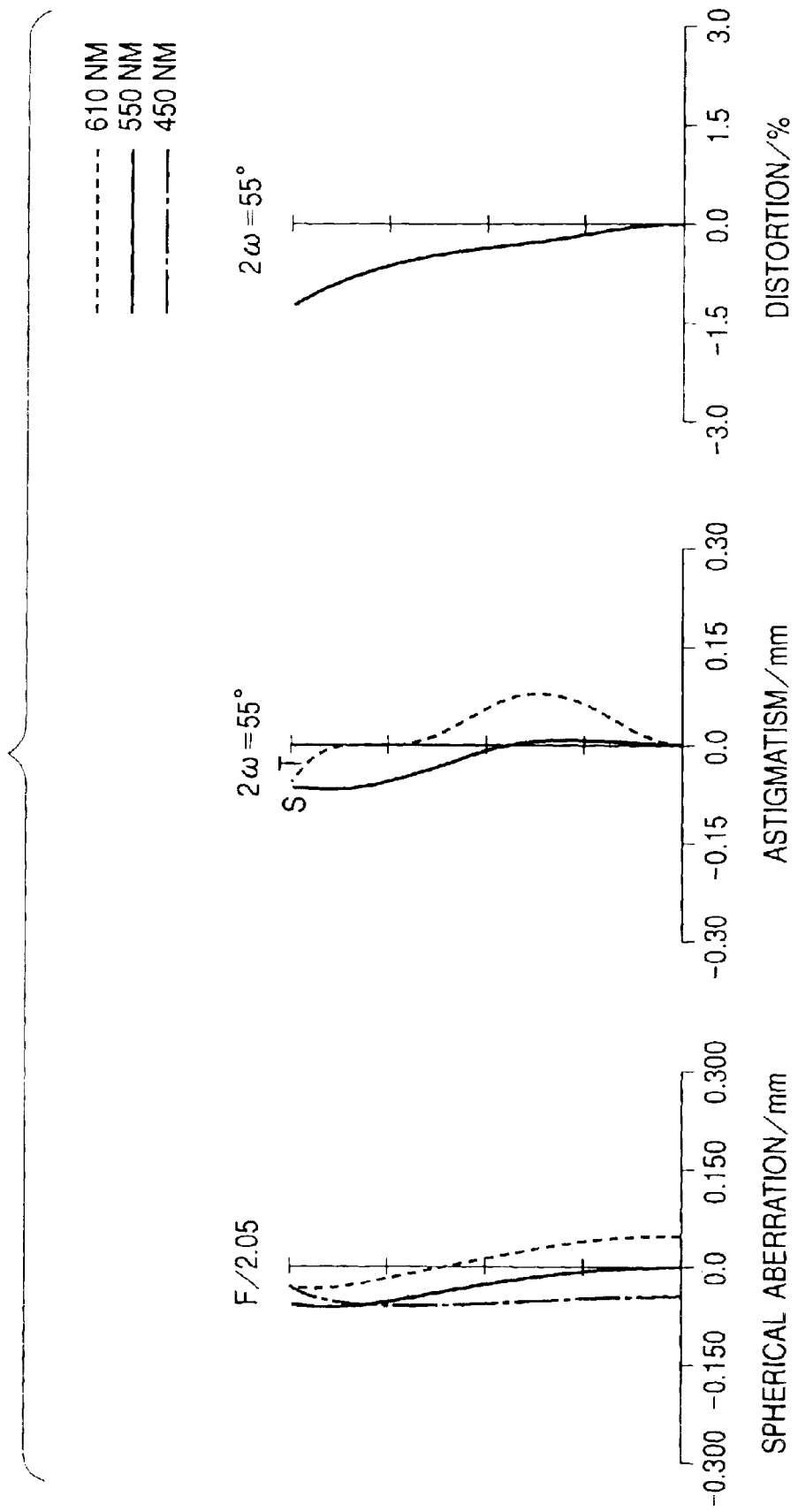
FIG. 6 is an aberration diagram at the telephoto end of the zoom lens according to the second embodiment (distance to the screen is 1.9 m)

FIG. 4 is a schematic diagram showing a main portion of a zoom lens according to a second embodiment of the present invention. FIGS. 5 and 6 are respectively aberration diagrams at the wide-angle end and the telephoto end of the zoom lens according to the second embodiment, with a distance to the screen being set at 1.9 m.

Figure 7:
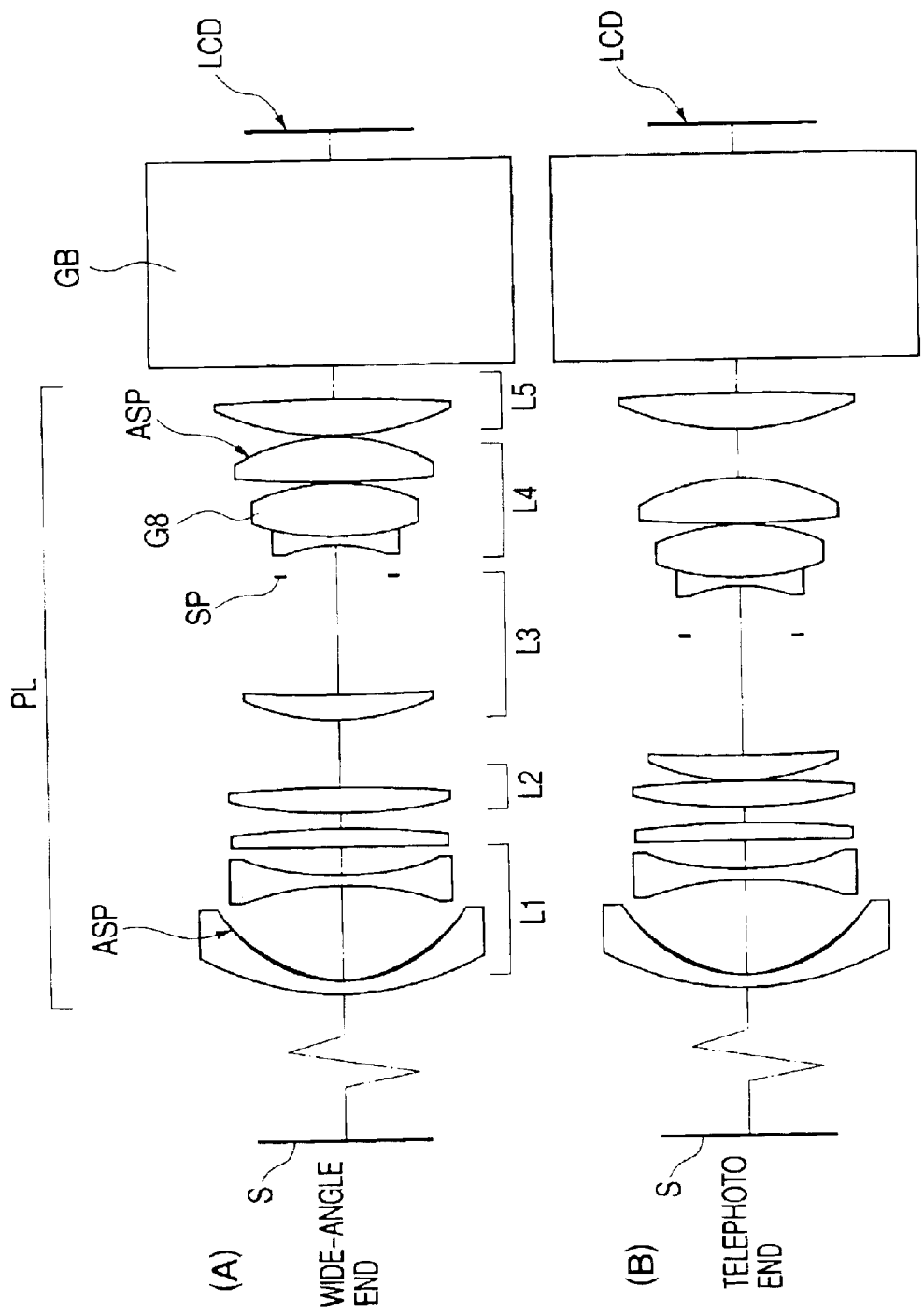
FIG. 7 is a schematic diagram showing a main portion of a zoom lens according to a third embodiment.
Figure 8:
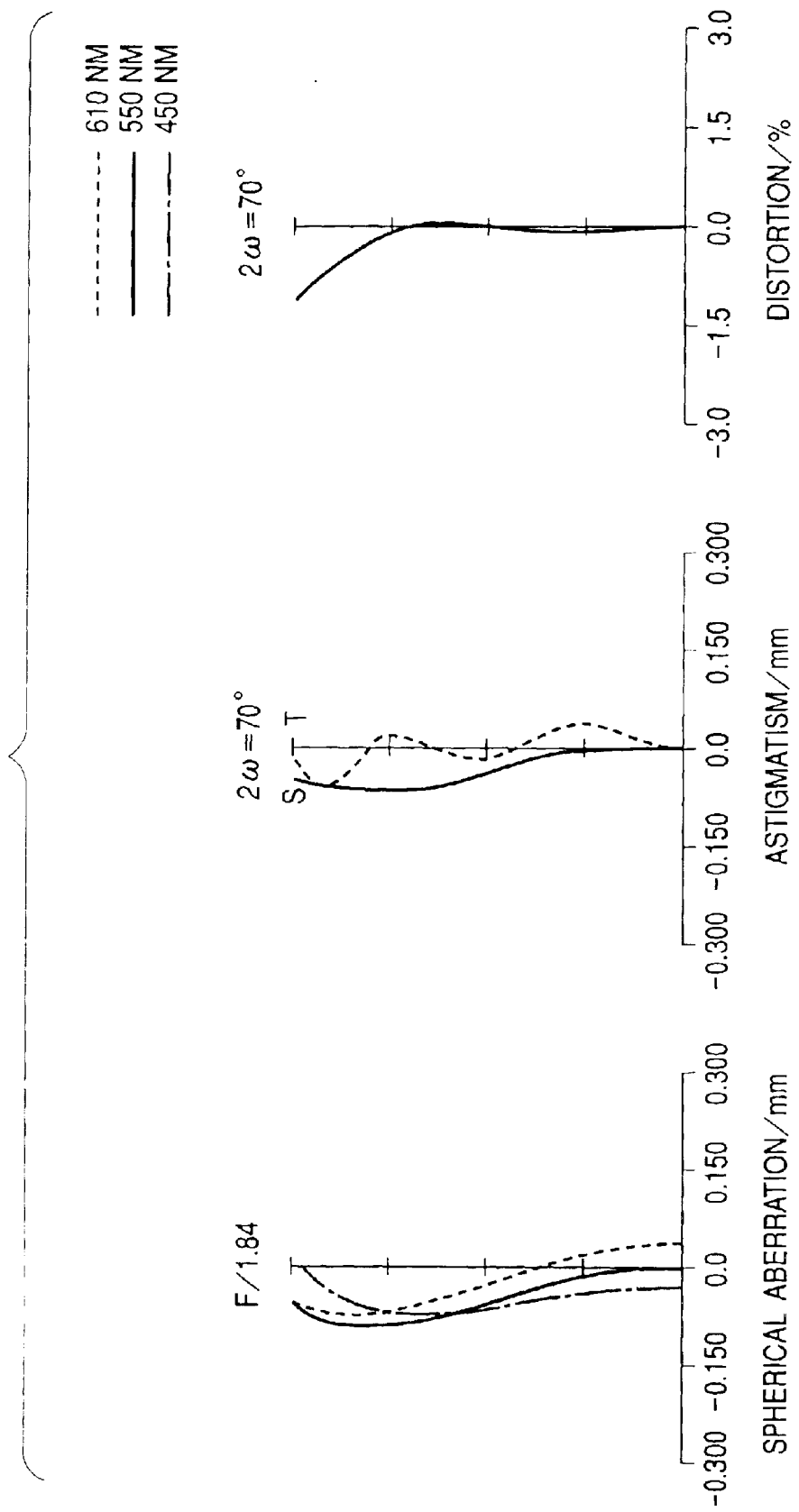
FIG. 8 is an aberration diagram at the wide-angle end of the zoom lens according to the third embodiment (distance to the screen is 1.7 m)
Figure 9:
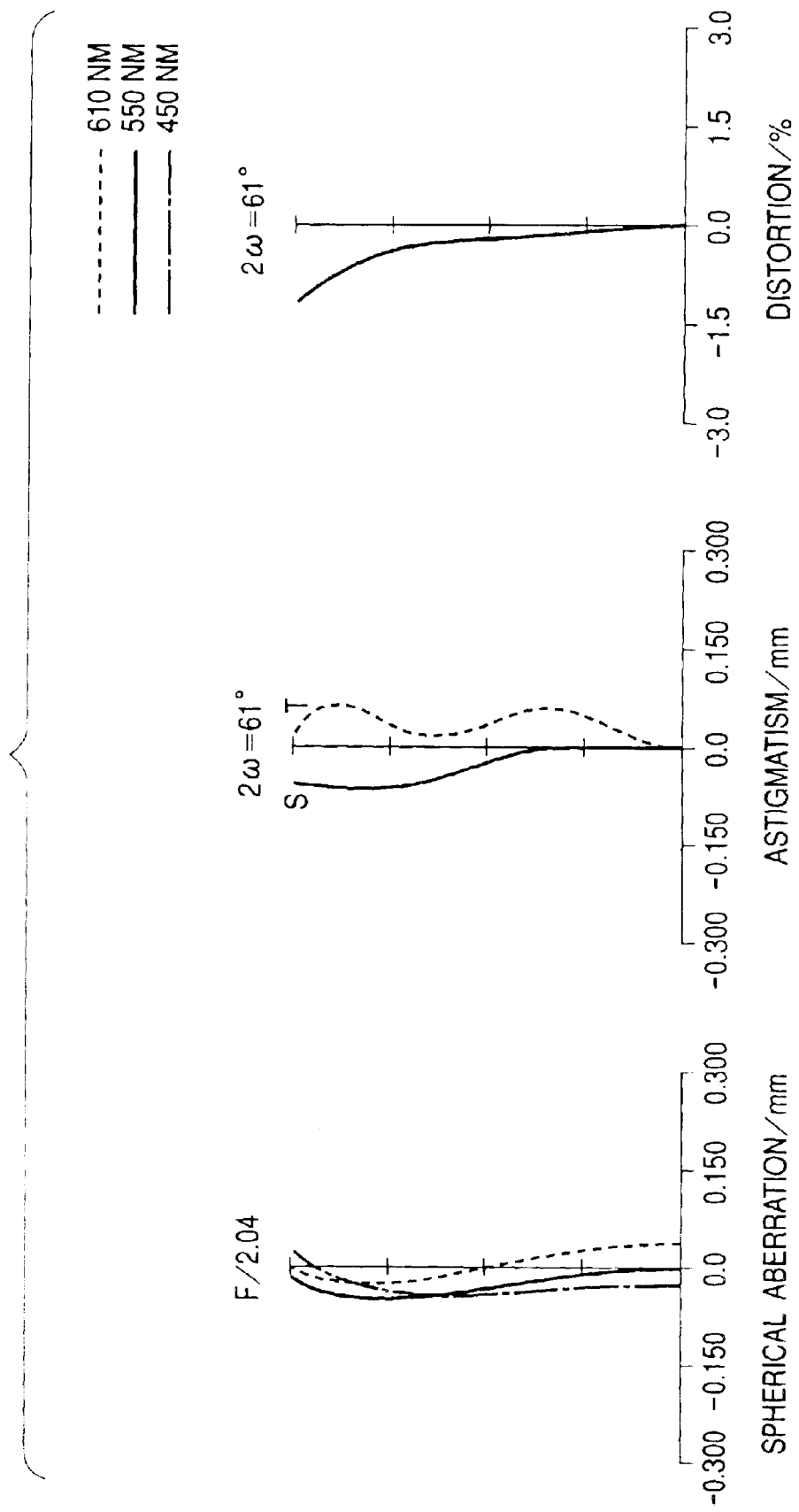
FIG. 9 is an aberration diagram at the telephoto end of the zoom lens according to the third embodiment (distance to the screen is 1.7 m)

FIG. 7 is a schematic diagram showing a main portion of a zoom lens according to a third embodiment of the present invention. FIGS. 8 and 9 are respectively aberration diagrams at the wide-angle end and the telephoto end of the zoom lens according to the third embodiment, with a distance to the screen being set at 1.7 m.

Figure 10:
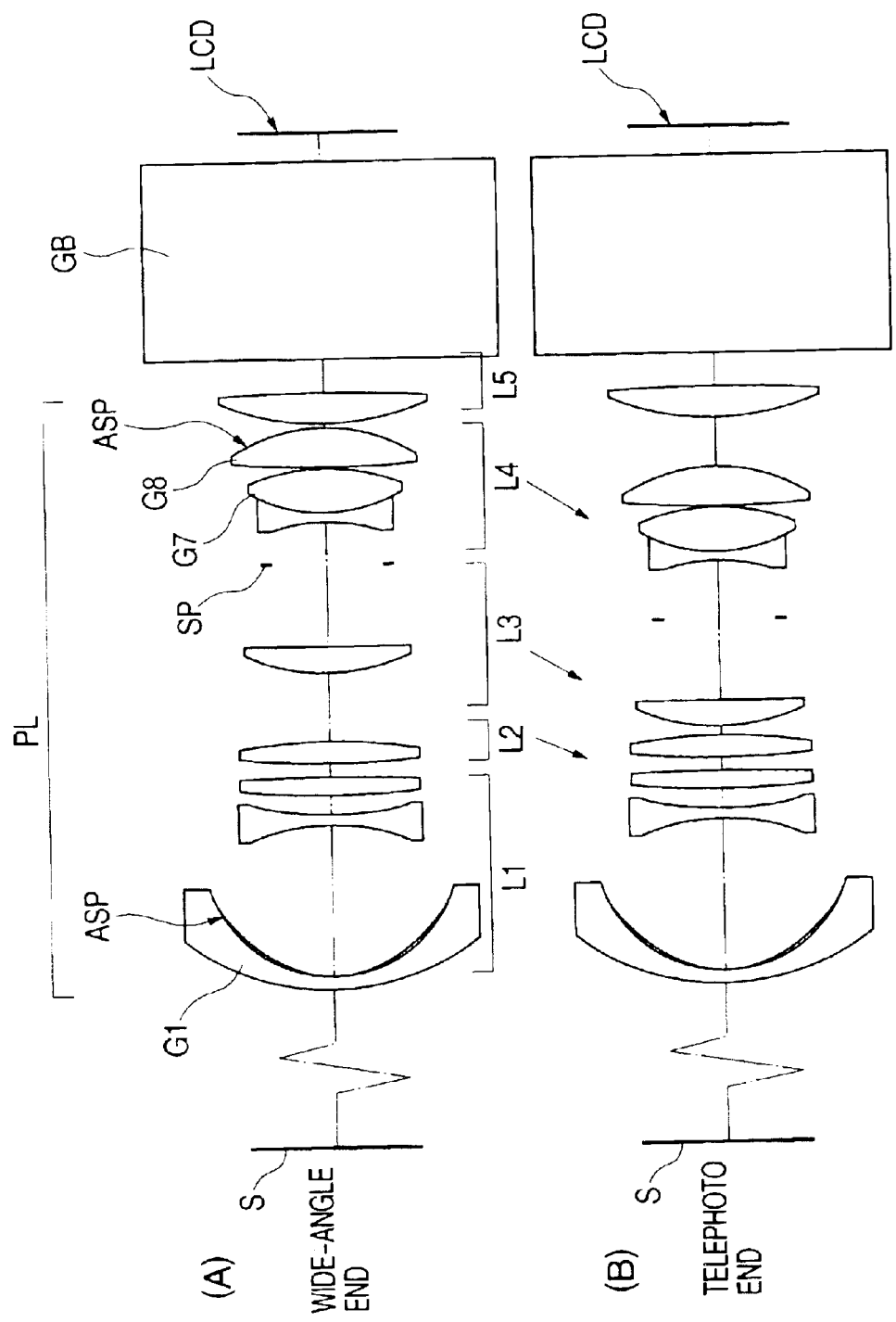
FIG. 10 is a schematic diagram showing a main portion of a zoom lens according to a fourth embodiment.
Figure 11:
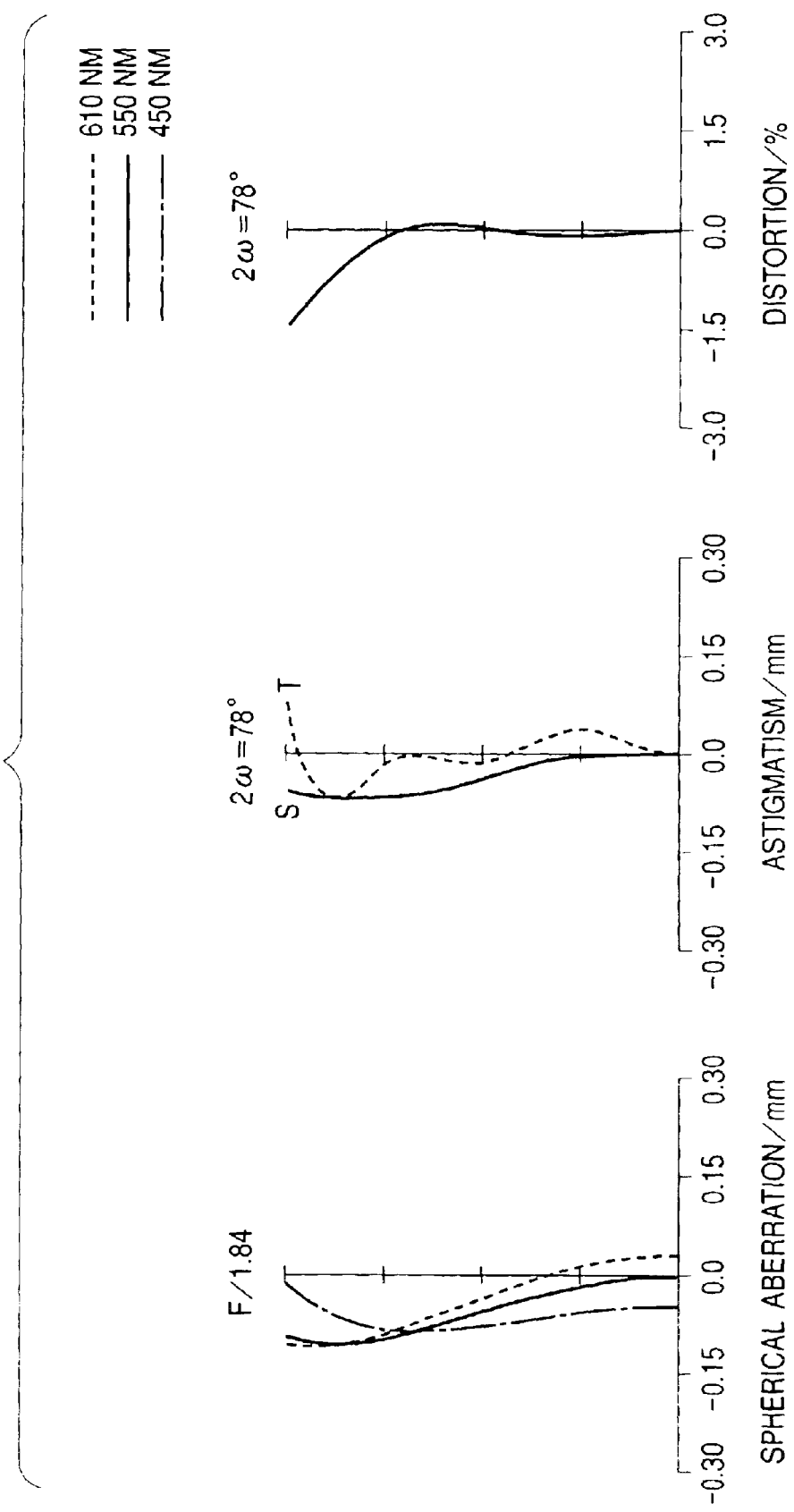
FIG. 11 is an aberration diagram at the wide-angle end of the zoom lens according to the fourth embodiment (distance to the screen is 1.5 m)
Figure 12:
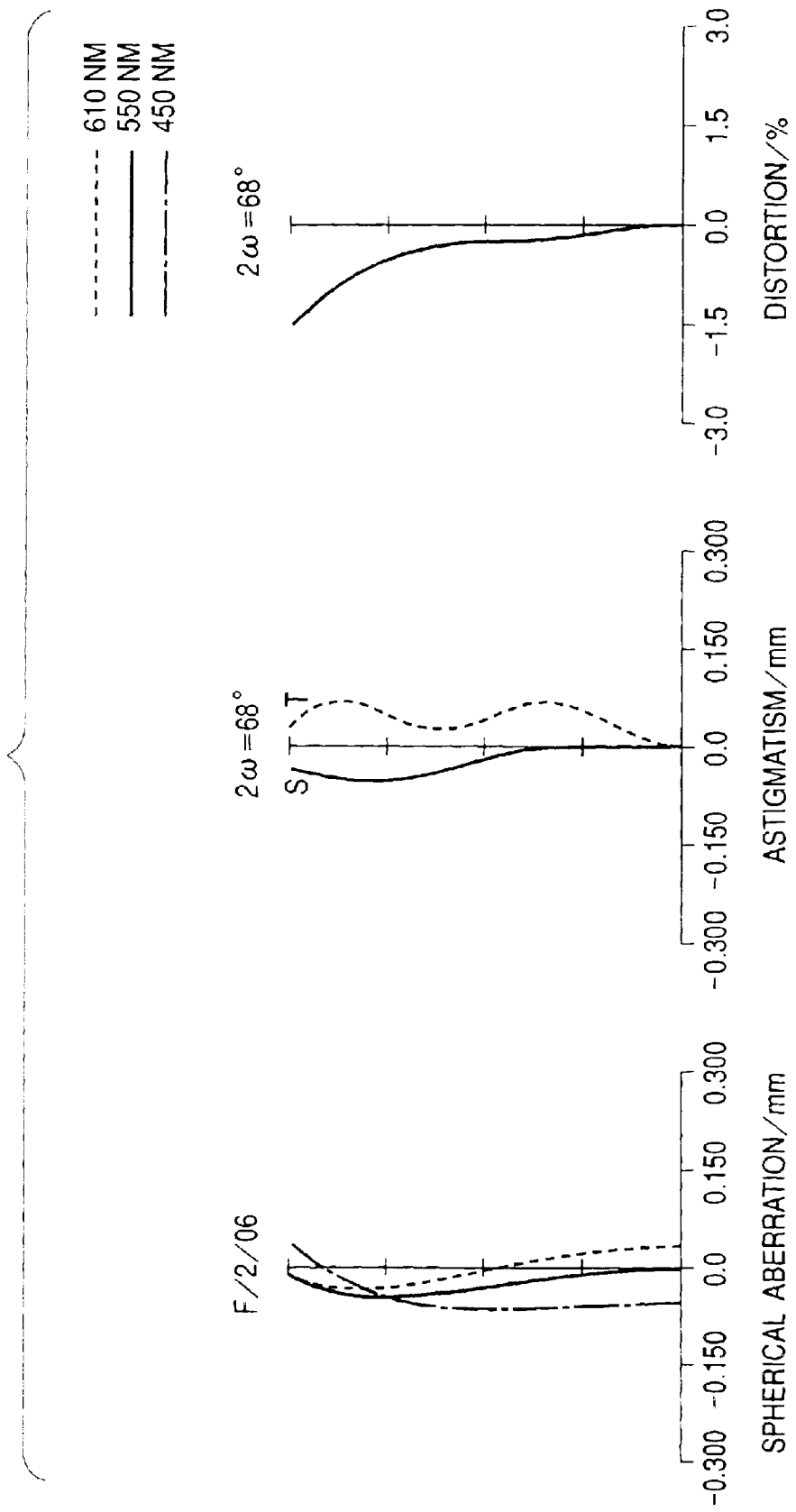
FIG. 12 is an aberration diagram at the telephoto end of the zoom lens according to the fourth embodiment (distance to the screen is 1.5 m)

FIG. 10 is a schematic diagram showing a main portion of a zoom lens according to a fourth embodiment of the present invention. FIGS. 11 and 12 are respectively aberration diagrams at the wide-angle end and the telephoto end of the zoom lens according to the fourth embodiment, with a distance to the screen being set at 1.5 m.

The zoom lenses according to the first to fourth embodiments are each used as a projection lens for a liquid crystal projector that enlarges and projects an original image on a screen.

In each of FIGS. 1, 4, 7, and 10, part (A) shows the position of each lens unit at the wide-angle end, and part (B) shows the position of each lens unit at the telephoto end. Also, reference symbol PL denotes a zoom lens (projection lens), reference symbol L1 denotes a first lens unit having negative refractive power (optical power=inverse number of a focal length), L2 denotes a second lens unit having positive refractive power, L3 denotes a third lens unit having positive refractive power, L4 denotes a fourth lens unit having positive refractive power, and L5 denotes a fifth lens unit having positive refractive power.

Further, reference symbol S represents a screen, and reference symbol LCD indicates a liquid crystal panel (liquid crystal display element) that displays an original image to be projected onto the screen S. The screen S and the display surface (original image) of the liquid crystal panel LCD are set in an optically conjugate relationship by the projection lens PL. Here, the screen S is a conjugate point (first conjugate point) having a longer distance and corresponds to an enlargement side (front of the projection lens PL), while the liquid crystal panel LCD is a conjugate point (second conjugate point) having a shorter distance and corresponds to a reduction side (rear of the projection lens PL).

Reference symbol GB denotes a glass block provided so as to correspond to a color combining prism, a polarizing filter, a color filter, and the like from the viewpoint of design. Also, reference symbol ASP represents a position of an aspherical surface, while reference symbol SP indicates an aperture stop.

The projection lens PL is mounted in a liquid crystal video projector main body (not shown) through a connection member (not shown). Components on the liquid crystal panel LCD side following the glass block GB are contained in the projector main body.

In each embodiment, at the time of zooming from the wide-angle end (A) to the telephoto end (B), the second lens unit L2, the third lens unit L3, and the fourth lens unit L4 move toward the first conjugate point side (screen S side) independently of each other, as indicated by an arrows. When doing so, the first lens unit L1 and the fifth lens unit L5 don't move. Also, focusing is performed by moving the first lens unit L1 on an optical axis.

In each embodiment, the lens unit having negative refractive power is arranged on the enlargement side and the lens unit having positive refractive power is arranged on the reduction side, thereby constructing a retrofocus type (negative lead type) lens system. With this construction, an increase in angle of view is realized and a longer back focus is ensured with ease. In each embodiment, in order to ensure a uniform illuminance distribution on the screen S, a multilayer coat is attached to each lens surface.

In view of a problem that it conversely becomes difficult to increase variable power, the number of lenses moved at the time of zooming is set at three, thereby realizing a compact optical system in which there are suppressed aberration variations at the time of zooming.

Also, both of the first lens unit L1 and the fifth lens unit L5 are fixed with reference to the reduction conjugate surface and the length of the entire zoom lens is maintained constant at the time of zooming, thereby ensuring robustness as a projection lens system. Also, the first lens unit L1 having a large effective diameter is set so as not to move at the time of zooming, thereby reducing changes in weight balance, which is advantageous from the viewpoint of mechanism.

At the time of zooming, the third lens unit L3 moves from the reduction side toward the enlargement side to thereby perform main magnification change, and the second lens unit L2 moves toward the enlargement side to thereby correct the movement of a focusing surface accompanying the magnification change. Like the third lens unit L3 that is a magnification changing lens unit, the fourth lens unit L4 moves toward the enlargement side to thereby correct the pupil movement ascribable to the movement of the aperture stop SP along with the third lens unit L3. In order to reduce aberration variations at the time of zooming, the fourth lens unit L4 moves in a direction along the movement of the aperture stop SP, that is, toward the enlargement side, and functions in the vicinity of a magnification that is around 100% (even magnification).

The fifth lens unit having positive refractive power is further independently added on the original image side to a conventional four-unit zoom lens including four lens units that respectively have negative refractive power, positive refractive power, positive refractive power, and positive refractive power, thereby weakening the synthesized positive refractive power of the first lens unit L1 to the fourth lens unit L4 and realizing a construction that is advantageous in increasing the angle of view and aperture. When the refractive power arrangement of this lens system is considered, the fifth lens unit L5 having positive refractive power tends to have relatively strong refractive power. Therefore, from the viewpoint of aberration correction, the average refractive index $N_{5p}$ of materials of positive lenses constituting the fifth lens unit L5 is set so that Conditional Expression (1) given below is satisfied.

$$1.63 < N_{5p} < 1.85 \tag{1}$$

It is more preferable that Condition Expression (1a) given below is satisfied.

$$1.65 < N_{5p} < 1.8 \tag{1a}$$

It should be noted that when the fifth lens unit L5 includes a single positive lens, the average refractive index $N_{5p}$ is the refractive index of the material of the positive lens.

A material having a high refractive index is used to produce the positive lens constituting the fifth lens unit L5, thereby making it possible to provide an effect of reducing the occurrence of off-axis aberrations, such as distortion, and introversive coma aberration which is ascribable to the long distance from the surface of the aperture stop SP and also making it possible to achieve a design in which the Petzval sum is reduced.

When the focal length of the first lens unit L1 is referred to as $f_1$ and the focal length of the entire system at the wide-angle end is referred to as $f_w$, setting has been made so that Conditional Expression (2) given below is satisfied.

$$0.5 < |f_w/f_1| < 1.0 \tag{2}$$

Conditional Expression (2) is an expression that determines magnifications at which the second lens unit L2 to the fifth lens unit L5 function. In the case below the lower limit of this expression, this is advantageous for aberration correction, but it becomes impossible to ensure a sufficient back focus for arranging the color combining system. Conversely, in the case exceeding the upper limit of the expression, the negative refractive power of the first lens unit L1 becomes strong and a back focus space exceeding a required level is generated. In addition, it becomes difficult to correct off-axis aberrations such as distortion. As a result, it is not preferable that the upper limit and the lower limit of Conditional Expression (2) are exceeded.

It is more preferable that Conditional Expression (2a) given below is satisfied.

$$0.65 < |f_w/f_1| < 0.95 \tag{2a}$$

Also, in order to reduce the number of lenses constituting the entire optical system, the fourth lens unit L4 having a small refractive power distribution is formed using less than four lenses. Also, in order to realize size reduction and in order to correct degradation of various aberrations with an increase in refractive power of each lens unit, at least one aspherical lens is adopted in the lens system.

As the aspherical lens, such a lens formed through glass molding or a hybrid aspherical surface obtained by molding a thin resin layer may be selected. Note that depending on the intended resolution and sensitivity of the aspheric surface, an aspherical lens produced through plastic molding may be used.

Also, it is originally preferable that the aperture stop SP is moved independently, although when consideration is also given to requirements concerning production such as the addition of a cam groove for moving, it is preferable that the aperture stop SP is arranged in a lens unit, such as the third lens unit L3, that moves at the time of zooming.

Further, when the focal length of the entire system at the wide-angle end is referred to as $f_w$, and the focal length of the fifth lens unit L5 is referred to as $f_5$, setting has been made so that Conditional Expression (3) given below is satisfied.

$$1.2 < f_5/f_w < 4 \tag{3}$$

As described above, the fifth lens unit L5 having positive refractive power is added in proximity to the original image, which weakens the synthesized refractive power of the first lens unit L1 to the fourth lens unit L4 and is advantageous in increasing the angle of view and aperture. In the case below the lower limit of Conditional Expression (3), the refractive power of the fifth lens unit becomes too strong, and therefore distortion, introversive coma flare, and the like become large. Conversely, in the case exceeding the upper limit of the expression, the refractive power of the fifth lens unit L5 becomes too weak, and an effect of weakening the refractive power of the first lens unit L1 to the fourth lens unit L4 is reduced, and then, an effect of enhancing performance is weakened. Therefore, it is not preferable that the upper limit and the lower limit of Conditional Expression (3) are exceeded. Also, it is preferable that a material having a refractive index as high as possible is adopted.

It is more preferable that Conditional Expression (3a) given below is satisfied.

$$2 < f_5/f_w < 3.8 \tag{3a}$$

Also, a mechanism for performing focusing in accordance with the change of the projection distance on the enlargement side is achieved by the first lens unit, so that an optical system having the simplest mechanism can be achieved.

Next, features of each embodiment will be described.

First, a first embodiment shown in FIG. 1 will be described.

The first lens unit L1 uses a three-lens configuration, in which a negative lens, a negative lens, and a positive lens are arranged in order from the enlargement side, and adopts an aspherical surface as the reduction-side surface of the negative lens closest to the enlargement side. This aspherical surface is an aspherical surface of hybrid type produced by molding a thin plastic layer on a spherical glass, and mainly corrects distortion with efficiency.

The second lens unit L2 has a single-lens configuration including only one positive lens whose both lens surfaces are each a convex surface. With this configuration, the second lens unit L2 mainly corrects various aberrations generated at the first lens unit L1 and corrects a focusing surface position on the reduction side at the time of zooming. This positive lens is produced using a glass material having a high refractive index (1.8 or higher), and performs a correction of the Petzval sum and reduces variations in aberrations, such as spherical aberration, at the time of zooming. If a large aperture and a fast response at a high spatial frequency are required, the depth of focus becomes shallow. Therefore, if curvature of field and astigmatism are increased at an intermediate image height or the like, a sense of resolution is degraded. In order to prevent this, it is important that the Petzval sum is corrected small. Further, from the viewpoint of correction of chromatic aberration, as a material of the second lens unit L2, a lanthanum-based dense flint material or the like having a high dispersion characteristic and an abnormal dispersion property is selected to correct the chromatic aberration of magnification occurring at the first lens unit L1 with efficiency. Further, magnifications at the wide-angle end of the third lens unit L3 and the fourth lens unit L4 which is responsible for the magnification change are in the vicinity of a magnification that is around 100% (even magnification), thereby reducing the moving amount of the second lens unit L2 at the time of focusing surface correction.

The third lens unit L3 has a single-lens configuration including only one positive lens whose both lens surfaces are each a convex surface, and functions as a main magnification changing lens unit. The third lens unit L3 is used in the vicinity of a magnification that is around 100% (even magnification) in the entire magnification changing region. Note that the aperture stop SP exists in the third lens unit L3, moves along with the third lens unit L3 at the time of zooming, and suppresses variations in off-axis aberrations at the time of zooming.

The fourth lens unit L4 has a four-lens configuration including a negative lens, a negative lens, a positive lens, and a positive lens, with the lens having negative refractive power being arranged closest to the enlargement side. By means of this lens having negative refractive power, the Petzval sum is reduced with efficiency. Further, the principal plane position is arranged on the liquid crystal panel LCD side, thereby making it easy to ensure favorable telecentric performance and a sufficiently long back focus. Also, both surfaces of a lens G9 on the reduction side are each an aspherical surface. The aspherical surface is produced through plastic molding, with the enlargement-side surface mainly correcting curvature of field with efficiency and the reduction-side surface mainly correcting distortion and spherical aberration with efficiency.

Also, the fifth lens unit L5 functions at a reduction magnification and weakens the synthesized refractive power of the first lens unit L1 to the fourth lens unit L4. Further, the fifth lens unit L5 is formed using a lens made of a material having a refractive index of 1.65.

In the first embodiment, the F number is set at 1.6 that is small, so that there is realized a zoom lens that is high in luminance and is capable of performing 100-inch projection with a short projection distance of around 3 m.

Next, a second embodiment shown in FIG. 4 will be described by centering on constructions that are different from those in the first embodiment.

The third lens unit L3 has a single-lens configuration including only one positive lens having a meniscus shape whose convex surface is directed toward the enlargement side.

The fourth lens unit L4 has a three-lens configuration including a negative lens, a positive lens, and a positive lens, with both lens surfaces of a lens G8 arranged on the reduction side being each a spherical surface. Also, as the material of a lens G7 of a laminated lens arranged on the enlargement side in the fourth lens unit L4, FSL5 (trade name) manufactured by Kabushiki Kaisha Ohara that is a relatively low dispersion glass is adopted. The lens G7 is not limited to this, and a high abnormal dispersion glass such as FPL51 (trade name) manufactured by Kabushiki Kaisha Ohara for further improvement in chromatic aberration and the like is adopted.

Also, the fifth lens unit L5 functions at a reduction magnification and weakens the synthesized refractive power of the first lens unit L1 to the fourth lens unit L4. The material of the lens constituting the fifth lens unit L5 is selected so as to have a refractive index of 1.72 that is larger than the refractive index in the first embodiment, thereby mainly favorably correcting the Petzval sum and various aberrations such as introversive coma and distortion. In this embodiment, if a glass having a refractive index of 1.8 or higher is adopted as the material of the lens constituting the fifth lens unit L5, it becomes possible to further increase the above-mentioned effect of correcting aberrations. Other constructions and functions are the same as those in the first embodiment.

In the second embodiment, the F number is set at 1.8 that is small, so that a zoom lens, which is high in luminance and is capable of performing 100-inch projection with a short projection distance of around 2.7 m, is realized.

Next, a third embodiment shown in FIG. 7 will be described by centering on differences from the first embodiment.

The third lens unit L3 has a single-lens configuration including only one positive lens having a meniscus shape whose convex surface is directed toward the enlargement side.

The fourth lens unit L4 has a three-lens configuration including a negative lens, a positive lens, and a positive lens, with the reduction-side surface of a lens G8 arranged closest to the reduction side being an aspherical surface. This aspherical surface is an aspherical surface of hybrid type produced by molding a thin plastic layer on a spherical glass, and mainly corrects distortion and spherical aberration with efficiency. Note that the aspherical surface may be as an aspherical surface formed through glass molding.

Also, the fifth lens unit L5 functions at a reduction magnification and weakens the synthesized refractive power of the first lens unit L1 to the fourth lens unit L4. Further, the fifth lens unit L5 is formed using a lens made of a material whose refractive index is 1.72. Other constructions and functions are the same as those in the first embodiment.

In the third embodiment, the F number is set at 1.8 that is small, so that there is realized a zoom lens that is high in luminance and is capable of performing 100-inch projection with a short projection distance of around 2.4 m.

Next, a fourth embodiment shown in FIG. 10 will be described by centering on differences from the first embodiment.

In the fourth embodiment, specifications having the widest angle of view in comparison with other embodiments are used, so that a lens configuration, where the refractive power of the first lens unit having negative refractive power is set particularly strong in comparison with other embodiments, is used. The first lens unit L1 has a three-lens configuration in which a negative lens, a negative lens, and a positive lens are arranged from the enlargement side, and an aspherical surface is adopted as the reduction-side surface of a negative lens G1 which is the closest to the enlargement side. The aspheric surface is an aspheric surface of hybrid type produced by molding a thin plastic layer on a spherical glass, and mainly suppresses the occurrence of distortion, coma aberration, and the like attributable to the asymmetric refractive power arrangement unique to a retrofocus lens.

The third lens unit L3 has a single-lens configuration including only one positive lens having a meniscus shape whose convex surface is directed toward the enlargement side.

The fourth lens unit L4 has a three-lens configuration including a negative lens, a positive lens, and a positive lens. As the materials of a positive lens G7 and a positive lens G8, FPL51 that is a low dispersion glass is adopted to thereby favorably correct chromatic aberration of magnification and the like in the peripheral portion of a screen. Further, the reduction-side surface of the positive lens G8 is an aspherical surface. In this embodiment, an aspherical surface of hybrid type produced by molding a thin plastic layer on a spherical glass is used, thereby mainly correcting distortion and spherical aberration with efficiency.

Also, the fifth lens unit L5 functions at a reduction magnification and weakens the synthesized refractive power of the first lens unit L1 to the fourth lens unit L4. Further, the fifth lens unit L5 is formed using a lens made of a material whose refractive index is 1.67. Other constructions and functions are the same as those in the first embodiment.

In the fourth embodiment, the F number is set at 1.8 that is small, so that a zoom lens that is high in luminance and is capable of performing 100-inch projection with a short projection distance of around 2.1 m is realized.

Hereinafter, numerical data (Numerical Embodiments 1 to 4) of the zoom lenses according to the first to fourth embodiment will be described. In each numerical embodiment, "i" indicates the order of an optical surface from the enlargement side, "Ri" indicates the radius of curvature of the i-th optical surface (i-th surface), "di" is a distance between the i-th surface and the (i+1)st surface, "Ni" and "vi" are respectively the refractive index and the Abbe number of the material of the i-th optical member with reference to a d-line, "f" is a focal length, "FNO" is an F number, and "ω" is a half angle of view.

Also, three surfaces which are the closest to the image side in Numerical Embodiment 1 and two surfaces which are the closest to the image side in Numerical Embodiments 2 to 4 are each a surface constituting the glass block GB corresponding to a color separating prism, a face plate, various filters, and the like.

Also, when the conic constant is referred to as "k," aspherical surface coefficients are respectively referred to as "A, B, C, D, E," and displacement in the optical axis direction at the position of a height "h" from the optical axis is referred to as "x" with reference to a surface vertex, the shape of the aspherical surface is expressed by the following expression:

$$x = \frac{(1/r)h^2}{1 + \sqrt{\{1 - (1+k)(h/r)^2\}}} + Ah^4 + Bh^6 + Ch^8 + Dh^{10} + Eh^{12}.$$

Here, "r" is the radius of curvature.

It should be noted here that the expression "e-Z" means "$10^{-z}$," for instance.

Relationships between respective conditional expressions described above and various numerical values in the numerical embodiments are shown in Table 1 given below.

Numerical Embodiment 1
f: 21.9 – 26.0 FNO: 1.60 – 1.77 ω: 29.05° – 25.02°

|  | Ri | di | Ni | vi |
|---|---|---|---|---|
| 1 | 101.512 | 1.65 | 1.705 | 41.2 |
| 2 | 19.804 | 0.05 | 1.526 | 51.4 |
| 3 | (Aspherical Surface) | 10.59 | | |
| 4 | −29.440 | 1.50 | 1.605 | 60.6 |
| 5 | 267.824 | 0.94 | | |
| 6 | −218.285 | 3.74 | 1.839 | 37.2 |
| 7 | −47.624 | (Variable) | | |
| 8 | 71.040 | 3.49 | 1.810 | 40.9 |
| 9 | −336.750 | (Variable) | | |
| 10 | 38.913 | 5.16 | 1.625 | 53.2 |
| 11 | −192.889 | (Variable) | | |
| 12 | −36.254 | 1.00 | 1.839 | 37.2 |
| 13 | −65.805 | 3.38 | | |
| 14 | −21.625 | 1.25 | 1.812 | 25.4 |
| 15 | 499.750 | 0.15 | | |
| 16 | 48.671 | 9.27 | 1.489 | 70.2 |
| 17 | −24.239 | 0.15 | | |
| 18 | (Aspherical Surface) | 4.58 | 1.532 | 55.5 |
| 19 | (Aspherical Surface) | (Variable) | | |
| 20 | 59.309 | 4.33 | 1.661 | 50.9 |
| 21 | −192.852 | 1.45 | | |
| 22 | ∞ | 41.50 | 1.625 | 58.2 |
| 23 | ∞ | 2.60 | 1.518 | 64.1 |
| 24 | ∞ | | | |

-continued

Distance Data

|  | W | T |
|---|---|---|
| d7 | 2.34 | 1.93 |
| d9 | 10.83 | 0.55 |
| d11 | 22.03 | 23.98 |
| d19 | 0.55 | 9.30 |

Aspherical Surface Data

|  | c (1/r) | k | A | B | C | D | E |
|---|---|---|---|---|---|---|---|
| 3 | 5.882e−02 | −8.094e−01 | −3.470e−06 | 4.374e−09 | −4.127e−11 | 1.016e−13 | −1.261e−17 |
| 18 | 1.941e−03 | −1.800e + 03 | −6.560e−06 | −1.646e−08 | −9.565e−12 | −5.385e−14 | 6.152e−16 |
| 19 | −2.392e−02 | −7.891e−01 | 2.950e−06 | −2.533e−09 | 1.130e−11 | −7.880e−14 | 7.862e−16 |

Numerical Embodiment 2
f: 19.2 − 22.9 FNO: 1.84 − 2.05 ω: 32.33° − 27.97°

|  | Ri | di | Ni | vi |
|---|---|---|---|---|
| 1 | 46.383 | 1.65 | 1.705 | 41.2 |
| 2 | 19.914 | 0.05 | 1.526 | 51.4 |
| 3 | (Aspherical Surface) | 12.21 |  |  |
| 4 | −46.696 | 1.50 | 1.605 | 60.6 |
| 5 | 59.000 | 3.15 |  |  |
| 6 | −117.243 | 2.63 | 1.839 | 37.2 |
| 7 | −64.042 | (Variable) |  |  |
| 8 | 69.656 | 3.95 | 1.839 | 37.2 |
| 9 | −223.405 | (Variable) |  |  |
| 10 | 37.955 | 3.86 | 1.776 | 49.6 |
| 11 | 6,991.750 | (Variable) |  |  |
| 12 | −21.065 | 1.25 | 1.854 | 23.8 |
| 13 | 39.720 | 8.95 | 1.489 | 70.2 |
| 14 | −22.356 | 0.20 |  |  |
| 15 | 339.726 | 4.07 | 1.661 | 50.9 |
| 16 | −42.429 | (Variable) |  |  |
| 17 | 42.559 | 4.61 | 1.727 | 38.0 |
| 18 | −201.557 | 5.00 |  |  |
| 19 | ∞ | 29.20 | 1.518 | 64.1 |
| 20 | ∞ |  |  |  |

Distance Data

|  | W | T |
|---|---|---|
| d7 | 2.06 | 1.95 |
| d9 | 10.63 | 0.55 |
| d11 | 25.65 | 28.92 |
| d16 | 0.55 | 7.47 |

Aspherical Surface Data

|  | c (1/r) | k | A | B | C | D | E |
|---|---|---|---|---|---|---|---|
| 3 | 5.882e−02 | −6.245e−01 | 1.563e−06 | −4.654e−08 | 3.006e−10 | −1.062e−12 | 1.378e−15 |

Numerical Embodiment 3
f: 17.2 − 20.4 FNO: 1.84 − 2.04 ω: 35.28° − 30.83°

|  | Ri | di | Ni | vi |
|---|---|---|---|---|
| 1 | 41.822 | 1.65 | 1.705 | 41.2 |
| 2 | 20.338 | 0.05 | 1.526 | 51.4 |
| 3 | (Aspherical Surface) | 13.90 |  |  |
| 4 | −47.727 | 1.50 | 1.605 | 60.6 |
| 5 | 42.130 | 4.22 |  |  |
| 6 | −24,464.713 | 2.45 | 1.839 | 37.2 |
| 7 | −144.720 | (Variable) |  |  |

-continued

| | | | | |
|---|---|---|---|---|
| 8 | 75.215 | 3.72 | 1.839 | 37.2 |
| 9 | −145.290 | (Variable) | | |
| 10 | 33.852 | 3.77 | 1.735 | 40.5 |
| 11 | 431.918 | (Variable) | | |
| 12 | −22.539 | 1.25 | 1.854 | 23.8 |
| 13 | 32.138 | 7.93 | 1.489 | 70.2 |
| 14 | −31.470 | 0.20 | | |
| 15 | 170.672 | 6.68 | 1.591 | 61.1 |
| 16 | −26.482 | 0.05 | 1.526 | 51.4 |
| 17 | (Aspherical Surface) | (Variable) | | |
| 18 | 43.286 | 5.01 | 1.727 | 38.0 |
| 19 | −230.165 | 5.00 | | |
| 20 | ∞ | 29.20 | 1.518 | 64.1 |
| 21 | ∞ | | | |

Distance Data

| | W | T |
|---|---|---|
| d7 | 2.37 | 1.96 |
| d9 | 9.92 | 0.55 |
| d11 | 21.78 | 24.68 |
| d17 | 0.55 | 7.43 |

Aspherical Surface Data

| | c (1/r) | k | A | B | C | D | E |
|---|---|---|---|---|---|---|---|
| 3 | 5.882e−02 | −6.497e−01 | 6.834e−07 | −4.593e−08 | 2.774e−10 | −9.143e−13 | 1.046e−15 |
| 17 | −3.619e−02 | −4.413e−01 | 1.169e−06 | 2.261e−09 | −1.199e−11 | −6.980e−14 | 3.333e−16 |

Numerical Embodiment 4
f: 14.9 − 17.7 FNO: 1.84 − 2.06 ω: 39.16° − 34.40°

| | Ri | di | Ni | vi |
|---|---|---|---|---|
| 1 | 37.044 | 1.65 | 1.705 | 41.2 |
| 2 | 19.103 | 0.05 | 1.526 | 51.4 |
| 3 | (Aspherical Surface) | 22.75 | | |
| 4 | −33.331 | 1.50 | 1.605 | 60.6 |
| 5 | 42.393 | 3.04 | | |
| 6 | 115.344 | 2.43 | 1.766 | 40.1 |
| 7 | −1,099.749 | (Variable) | | |
| 8 | 136.432 | 3.14 | 1.839 | 37.2 |
| 9 | −71.027 | (Variable) | | |
| 10 | 33.681 | 3.53 | 1.735 | 40.5 |
| 11 | 1,322.136 | (Variable) | | |
| 12 | −25.827 | 1.25 | 1.826 | 29.7 |
| 13 | 23.164 | 6.70 | 1.498 | 81.5 |
| 14 | −31.410 | 0.15 | | |
| 15 | 111.567 | 6.10 | 1.498 | 81.5 |
| 16 | −23.3034 | 0.05 | 1.526 | 51.4 |
| 17 | (Aspherical Surface) | (Variable) | | |
| 18 | 37.812 | 4.46 | 1.673 | 47.2 |
| 19 | −846.872 | 5.00 | | |
| 20 | ∞ | 29.20 | 1.518 | 64.1 |
| 21 | ∞ | | | |

Distance Data

| | W | T |
|---|---|---|
| d7 | 2.28 | 1.97 |
| d9 | 10.54 | 1.70 |
| d11 | 18.89 | 21.27 |
| d17 | 0.55 | 7.30 |

Aspherical Surface Data

| | c (1/r) | k | A | B | C | D | E |
|---|---|---|---|---|---|---|---|
| 3 | 6.452e−02 | −6.810e−01 | 4.419e−06 | −4.335e−08 | 2.465e−10 | −7.187e−13 | 5.847e−16 |
| 17 | −4.053e−02 | −2.775e−01 | −2.809e−07 | −6.822e−09 | −4.690e−11 | 5.243e−14 | −5.340e−16 |

-continued

Table 1

| Conditional Expression | Numerical Embodiment | | | |
|---|---|---|---|---|
| | 1 | 2 | 3 | 4 |
| (1) $N_{5p}$ | 1.66 | 1.72 | 1.72 | 1.67 |
| (2) $|f_w/f_1|$ | 0.893 | 0.846 | 0.825 | 0.894 |
| (3) $f_5/f_w$ | 3.169 | 2.544 | 2.949 | 3.625 |

Figure 13:
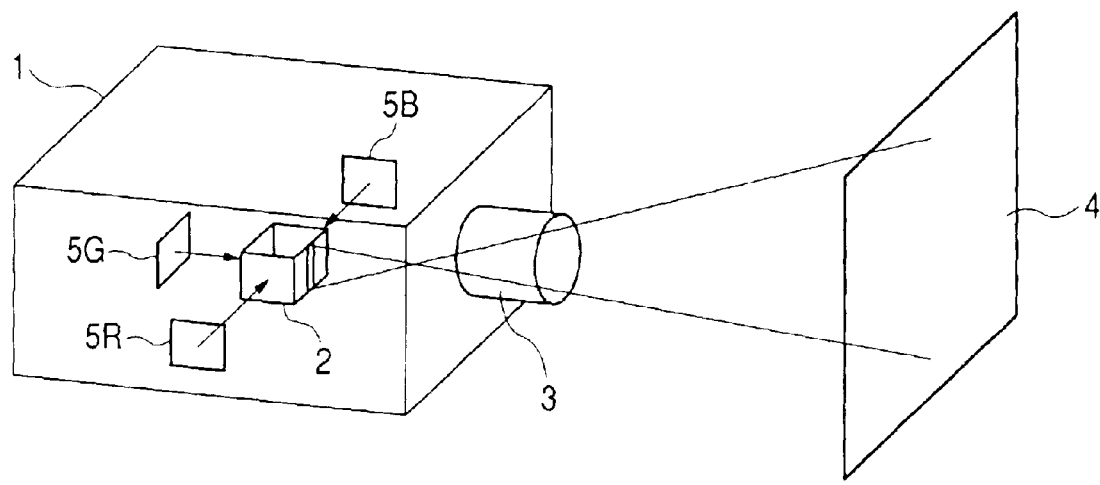
FIG. 13 is a schematic diagram showing a main portion of a liquid crystal projector.

FIG. 13 is a schematic diagram showing a main portion of an embodiment of an image projection apparatus (projector).

In the drawing, an image projection apparatus is shown. The image projection apparatus is produced by applying the zoom lens described above to a three-panel color liquid crystal projector that combines pieces of image information of multiple color light beams based on multiple liquid crystal display elements through a color combining means, and enlarges and projects a resultant image on a screen surface through a projection lens. In FIG. 13, the color liquid crystal projector 1 combines red (R), green (G), and blue (B) light beams from R, G, and B liquid crystal panels 5R, 5G, and 5B onto one optical path through a prism 2 serving as a color combining means, and projects a resultant image onto a screen 4 using a projection lens 3 formed by the zoom lens described above.

Figure 14:
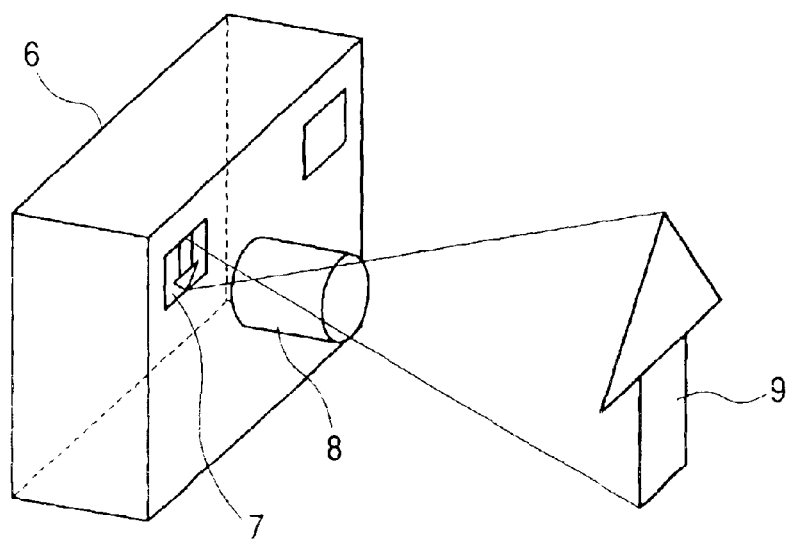
FIG. 14 is a schematic diagram showing a main portion of a camera.

FIG. 14 is a schematic diagram showing a main portion of an embodiment of a camera. In this embodiment, an example is shown, in which the zoom lens described above is used as a photographing lens of a video camera, a film camera, a digital camera, or the like.

In FIG. 14, an image of a subject 9 is formed on a photosensitive element 7 using a photographing lens 8, thereby obtaining image information. The photosensitive element 7 corresponds to a silver salt film in the case of a film camera, and corresponds to a solid-state image pickup element, such as a CCD sensor or a CMOS sensor, in the case of a video camera or a digital camera.

It should be noted here that when the zoom lens described above is applied as the photographing lens, the position of the object corresponds to the enlargement side (front) at the conjugate point (first conjugate point) having a longer distance, and the position of the photosensitive element corresponds to the reduction side (rear) at the conjugate point (second conjugate point) having a shorter distance.

What is claimed is:

1. A zoom lens system comprising, in order from the front to the rear:

a first lens unit having negative optical power;

a second lens unit having positive optical power;

a third lens unit having positive optical power;

a fourth lens unit having positive optical power; and a fifth lens unit having positive optical power, wherein at least three lens units out of the first lens unit to the fifth lens unit move during zooming, and the following condition is satisfied:

$$1.63 < N_{5p} < 1.85$$

where $N_{5p}$ is an average refractive index of a material of each positive lens element possessed by the fifth lens unit.

2. A zoom lens system according to claim 1, wherein the first lens unit and the fifth lens unit don't move for zooming.

3. A zoom lens system according to claim 1, wherein the second lens unit, the third lens unit, and the fourth lens unit move toward the front during zooming from a short focal length end to a long focal length end.

4. A zoom lens system according to claim 1, wherein the following condition is satisfied:

$$0.5 < |f_w/f_1| < 1.0$$

where $f_1$ is a focal length of the first lens unit and $f_w$ is a focal length of an entire system at a wide-angle end.

5. A zoom lens system according to claim 1, wherein the number of lens elements possessed by the fourth lens unit is equal to or less than four.

6. A zoom lens system according to claim 1 further comprising:

an aperture stop that is arranged one of inside of the third lens unit and in the vicinity of the third lens unit, wherein the aperture stop moves integrally with the third lens unit during zooming.

7. A zoom lens system according to claim 1, wherein the following condition is satisfied:

$$1.2 < f_5/f_w < 4$$

where $f_w$ is a focal length of an entire system at a wide-angle end and $f_5$ is a focal length of the fifth lens unit.

8. A zoom lens system according to claim 1, wherein the first lens unit moves at the time of focusing.

9. A projector comprising:

a display element that displays an original image; and the zoom lens system according to claim 1, which projects the original image displayed by the display element onto a screen.

10. A camera comprising:

the zoom lens system according to claim 1; and a solid-state image pickup element that receives an image formed by the zoom lens system.

* * * * *